United States Patent
Sung

(10) Patent No.: US 6,279,650 B1
(45) Date of Patent: Aug. 28, 2001

(54) TEMPERATURE-HUMIDITY CONTROLLER FOR SEMICONDUCTOR EQUIPMENT AND CONTROLLING METHOD THEREOF

(75) Inventor: Myeon-Chang Sung, Seoul (KR)

(73) Assignee: Dasan C & I Co., Ltd., Seoul (KR)

( * ) Notice: Subject to any disclaimer, the term of this patent is extended or adjusted under 35 U.S.C. 154(b) by 0 days.

(21) Appl. No.: 09/406,054

(22) Filed: Sep. 27, 1999

(30) Foreign Application Priority Data

Jun. 29, 1999 (KR) .................................................. 99-25154

(51) Int. Cl.[7] .................................................. F25B 29/00
(52) U.S. Cl. ..................... 165/222; 165/228; 165/230; 165/60; 165/65; 62/3.4; 62/310; 261/151; 261/152; 261/153; 261/157; 236/44 C
(58) Field of Search .................................... 165/222, 223, 165/224, 225, 226, 227, 228, 229, 230, 60, 63, 64, 65; 62/3.4, 3.64, 3.3, 310; 261/153, 151, 152, 157; 236/44 C

(56) References Cited

U.S. PATENT DOCUMENTS

| | | | |
|---|---|---|---|
| 2,284,914 | * 6/1942 | Miller | 165/222 |
| 2,419,119 | * 4/1947 | Christensen | 165/230 |
| 2,545,491 | * 3/1951 | Ohlheiser | 165/229 |
| 3,415,313 | * 12/1968 | Olstad | 165/226 |
| 3,424,231 | * 1/1969 | Truhan | 165/230 |
| 4,711,294 | * 12/1987 | Jacobs et al. | 165/230 |
| 5,590,532 | * 1/1997 | Bachman | 62/3.64 |

FOREIGN PATENT DOCUMENTS

| | | | |
|---|---|---|---|
| 0242028 | * 9/1990 | (JP) | 62/3.4 |
| WO 92/14104 | * 8/1992 | (WO) | 62/3.64 |

* cited by examiner

Primary Examiner—John K. Ford
(74) Attorney, Agent, or Firm—Dann, Dorfman, Herrell and Skillman; Henry H. Skillman

(57) ABSTRACT

A temperature-humidity controller for a semiconductor equipment comprises a housing; an inlet pipe for introducing processing air, which has a discharging portion for flowing the air into an inner portion of the housing; a water supplying means for supplying water into the inner portion of the housing so as to contact with the processing air from the discharging portion of the inlet pipe thereby simultaneously performing dehumidifying and humidifying processes; a cooling means for cooling the water at a dew point; a heating means for heating the air at a desired temperature, which is dehumidified and humidified by the water supplying means; an outlet pipe for supplying the heated air to the semiconductor equipment.

1 Claim, 4 Drawing Sheets

TEMPERATURE-HUMIDITY CONTROLLER FOR SEMICONDUCTOR EQUIPMENT AND CONTROLLING METHOD THEREOF

BACKGROUND OF THE INVENTION

1. Field of the Invention

The present invention relates to a temperature-humidity controller for a semiconductor device fabricating equipment, in which a humidifying or dehumidifying process of a processing air is simultaneously performed while the air is passed through a cooled water flow, and a controlling method thereof.

2. Description of the Related Art

Generally, in the fabricating processes of the semiconductor device, precise process conditions are required. In order to satisfy the conditions, it is necessary to properly control a temperature and a humidity of processing air which is supplied to a semiconductor device fabricating equipment (hereinafter, semiconductor equipment). In a conventional production system, a temperature-humidity controller (THC) for the semiconductor equipment is provided in an air supplying portion thereof so as to properly control the temperature and the humidity of the processing air. The air is treated to have a constant temperature and humidity by the THC, and then supplied to the semiconductor equipment. Therefore, the semiconductor device of good quality which satisfies the process conditions can be fabricated.

As shown in FIG. 1, the THC for the semiconductor equipment typically comprises a chemical filter, a dehumidifying means, a heating means and a humidifying means. They are separately disposed and communicated with each other by ducts. Therefore, if the air is introduced from the outside, a particular element, for example, ammonia contained in the air is filtered out by the chemical filter. Then, the air which the ammonia is filtered out is supplied through the duct to the dehumidifying means.

Sequentially, a predetermined amount of moisture contained in the air is removed by the dehumidifying means. The air is moved through the duct to the heating means and heated at a predetermined temperature. The air is then moved through the duct to the humidifying means so as to compensate for the moisture which is excessively eliminated by the dehumidifying means. After compensation of the moisture, the air is supplied to the semiconductor equipment.

Therefore, the air is supplied to the semiconductor equipment after being controlled through the above mentioned processes so as to have a proper temperature and a proper humidity (e.g. 23° C., 40%).

In the above THC, the dehumidifying means generally comprises a compressor and a cooling pipe. A cooling gas, e.g. Freon is introduced into the cooling pipe. The air is contacted with the cooling pipe so as to be cooled, whereby the moisture in the air is facilely removed.

However, in the dehumidifying means which employs the Freon, there are some problems that environment and noise problems are arisen, due to the using of the Freon, and an occupation area of the equipment is increased.

Further, since each of the means which comprises of the equipment is separately disposed and connected with each other by the ducts, it is very difficult to maintain entirely the equipment.

To solve the problems, there is proposed an improved THC in which a semiconductor device instead of the Freon is employed.

FIG. 2 is a perspective view showing a conventional THC in which a semiconductor device is used.

As shown in FIG. 2, an air supplying port 102 is disposed at one side, e.g. an upper side of a housing 101. A chemical filter 110 by which a component of ammonia contained in the air is filtered and held to a desired amount (e.g., less than 1 ppb) is mounted at a lower portion of the air supplying port 102.

Meanwhile, through openings A are formed at both sides of the housing 101. A pair of dehumidifying means 120 are inserted into each through openings A. In the dehumidifying means 120, their surfaces are rapidly cooled by an operation of semiconductor devices so as to lower a temperature of the air, thereby dehumidifying the moisture contained in the air.

The dehumidifying means 120 comprises a cooling plate 121, a heat insulating plate 122, a radiating plate 123 and a cover plate 124. The cooling plate 121 is provided with a plurality of cooling fins 121a which are serially arranged and the semiconductor devices which are not shown. The heat insulating plate 122 serves to prevent a heat exchange between the semiconductor devices. The radiating plate 123 discharges the heat from the semiconductor devices to the outside. The cover plate 124 protects the semiconductor from a shock.

And, another through openings B are formed at the sides of the housing 101. A pair of heating means 130 are inserted into the through openings B. The heating means 130 are rapidly heated by a coil 131 and increases the temperature of the air, thereby compensating the temperature of the air which is cooled by the dehumidifying means 120.

Further, a humidifying means 140 is disposed at the lower portion of the housing 101. The humidifying means 140 sprays moisture through a ultrasonic oscillator so as to supplement the moisture of the air which is excessively dehumidified by the dehumidifying means 120.

As described above, the dehumidifying means 120, the heating means 130 and the humidifying means 140 which comprise the THC 100 for the semiconductor equipment are mounted on or inserted into the housing 101 and forms one unit.

Here, the semiconductor device is made of one of $Bi_2Te_3$, $Bi_2Se_3$ and $Sb_2Te_3$ which have a good function of heat transfer.

The operation of the conventional THC like above will be described more fully.

The air which is introduced through the air supplying port 102 into the housing 101 is filtered by the chemical filter 110, and flows into the dehumidifying means 120. The air flows through the cooling fins 121a and is cooled. Therefore, the moisture contained in the air is rapidly liquidized and then fallen to the lower of the housing 101.

Sequentially, the air which is passed through the dehumidifying means 120 is introduced into the heating means 130 so as to compensate the temperature of the air which is cooled by the dehumidifying means 120. The air is then introduced into the humidifying means 140 which is disposed at the lower portion of the housing 101.

At this time, the humidifying means 140 sprays the moisture through the ultrasonic oscillator so as to supplement the moisture of the air which is excessively dehumidified by the dehumidifying means 120.

And then, the air is supplied through a blower (not shown) to the semiconductor equipment.

However, in the conventional THC as described above, there are some problems as follows:

First, since, after dehumidifying the air, it is necessary to heat and humidify again the air to obtain a desired temperature and humidity of the air, the processes for treating the air are complicated. And since the dehumidifying and humidifying processes are compulsively performed, energy loss is increased.

In addition, since the (heating type or ultrasonic type) humidifying means should be precisely controlled, it is very difficult to obtain a desired precision and it is frequently out of order.

Further, since the dehumidifying, heating and humidifying processes are separately controlled, the controlling operation is complicate and hard.

SUMMARY OF THE INVENTION

It is therefore an object of the present invention to provide a temperature-humidity controller for a semiconductor device fabricating equipment, in which a humidifying or dehumidifying process for the air is simultaneously performed while the air is passed through a cooled water flow, and a controlling method thereof.

To achieve the above objects and other advantages, there is provided a method of controlling a temperature and humidity of air for a semiconductor equipment comprising the steps of: introducing a processing air; passing the air through injected water thereby simultaneously performing dehumidifying and humidifying processes of the air; heating the air which is dehumidified and humidified; supplying the heated air to the semiconductor equipment.

At this time, it is preferable that the processing air is cooled at a dew point by the injected water.

It is preferable that the injected water is cooled by a semiconductor device.

Further, it is preferable that the injected water is cooled by Freon.

Further, according to the present invention, there is provided a temperature-humidity controller for a semiconductor equipment comprises a housing; an inlet pipe for introducing processing air into an inner portion of the housing; a water supplying means for supplying water into the inner portion of the housing so as to contact with the processing air from the inlet pipe thereby simultaneously performing dehumidifying and humidifying processes; a cooling means for cooling the water at a dew point; a heating means for heating the air at a desired temperature, which is dehumidified and humidified by the water supplying means; an outlet pipe for supplying the heated air to the semiconductor equipment.

Preferably, the water supplying means comprises a circulation pipe of which both ends are respectively connected with upper and lower portions of the housing, and a pump for circulating the water in the circulation pipe, which is disposed at a desired position of the circulation pipe.

Further, the cooling means is a semiconductor device having a heat absorbing part and a heat discharging part, the circulation pipe passing through the heat absorbing part.

And it is preferable that the outlet pipe passes through the heat discharging part of the cooling means so that the air which is dehumidified and humidified is pre-heated prior to the heating process by the heating means.

In addition, the heating means comprises a heat coil disposed at an exit side of the outlet pipe, a variable resistor and a resistance regulating lever for controlling a power supplied to the heat coil.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown.

First of all, for understanding of a temperature-humidity controller (THC) according to the present invention, it will be briefly explained about a principle of the present invention.

A relative humidity can be indicated as a ratio of current water vapor pressure to saturated water vapor pressure as defined by the following equation:

Relative humidity=(current water vapor pressure/saturated water vapor pressure)×100

However, since the saturated water vapor pressure indicates an amount of moisture contained in an air at a temperature, the amount is changed according to the temperature. That is, if the temperature is lowered, the saturated water vapor pressure is also reduced at the temperature.

Therefore, if the saturated water vapor pressure is reduced, the relative humidity is increased. In addition, if the temperature is continuously lowered until the relative humidity reaches 100%, through the temperature is further lowered, the relative humidity is not increased and an extra moisture is condensed into water.

A temperature at which the relative humidity reaches 100% is called a dew point. And the cooling process of the air below the temperature, i.e., dew point reduces the amount of moisture in the air.

Accordingly, a conventional THC cools a processing air below the dew point using a semiconductor device or Freon so that the moisture in the air is minimized. After that, the humidifying and heating processes are performed.

Meanwhile, in the THC according to the present invention, the cooling process of the processing air at the dew point is performed by water cooled at a desired temperature, whereby the dehumidifying and humidifying processes are simultaneously performed.

Figure 1:
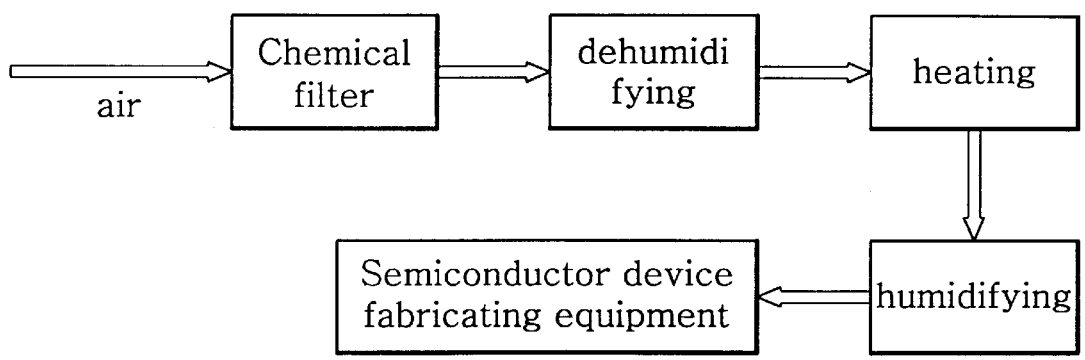
FIG. 1 is a block diagram showing a controlling process of a conventional temperature-humidity controller.
Figures 2, 2A:
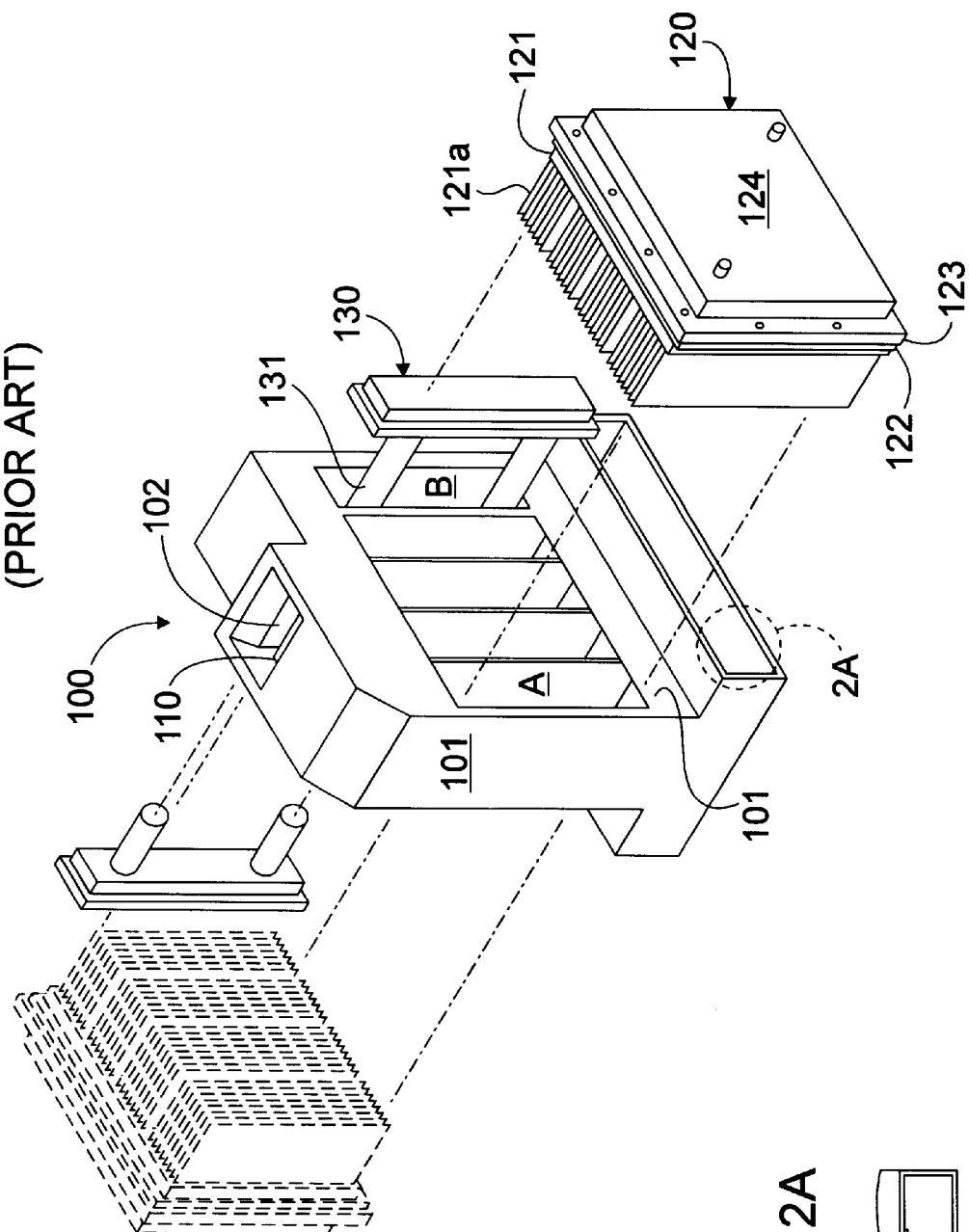
FIG. 2 is a perspective view of the conventional temperature-humidity controller in FIG. 1.
FIG. 2A is a fragmentary elevational view of the part circled in FIG. 2.
Figure 3:
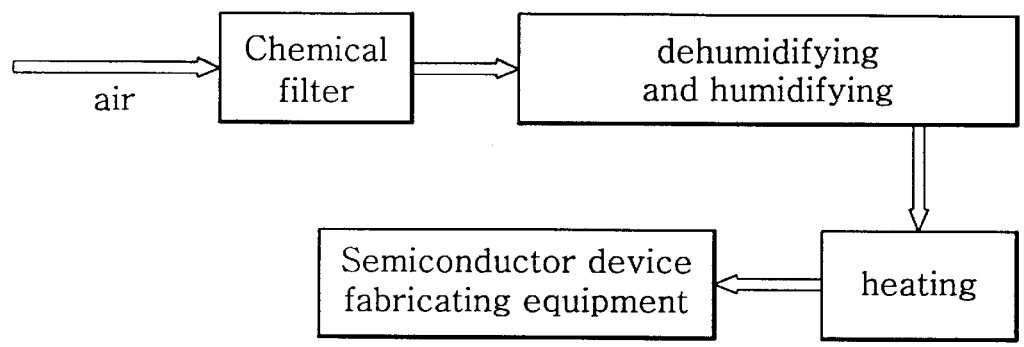
FIG. 3 is a block diagram showing a controlling process of a temperature-humidity controller according to the present invention.
Figure 4:
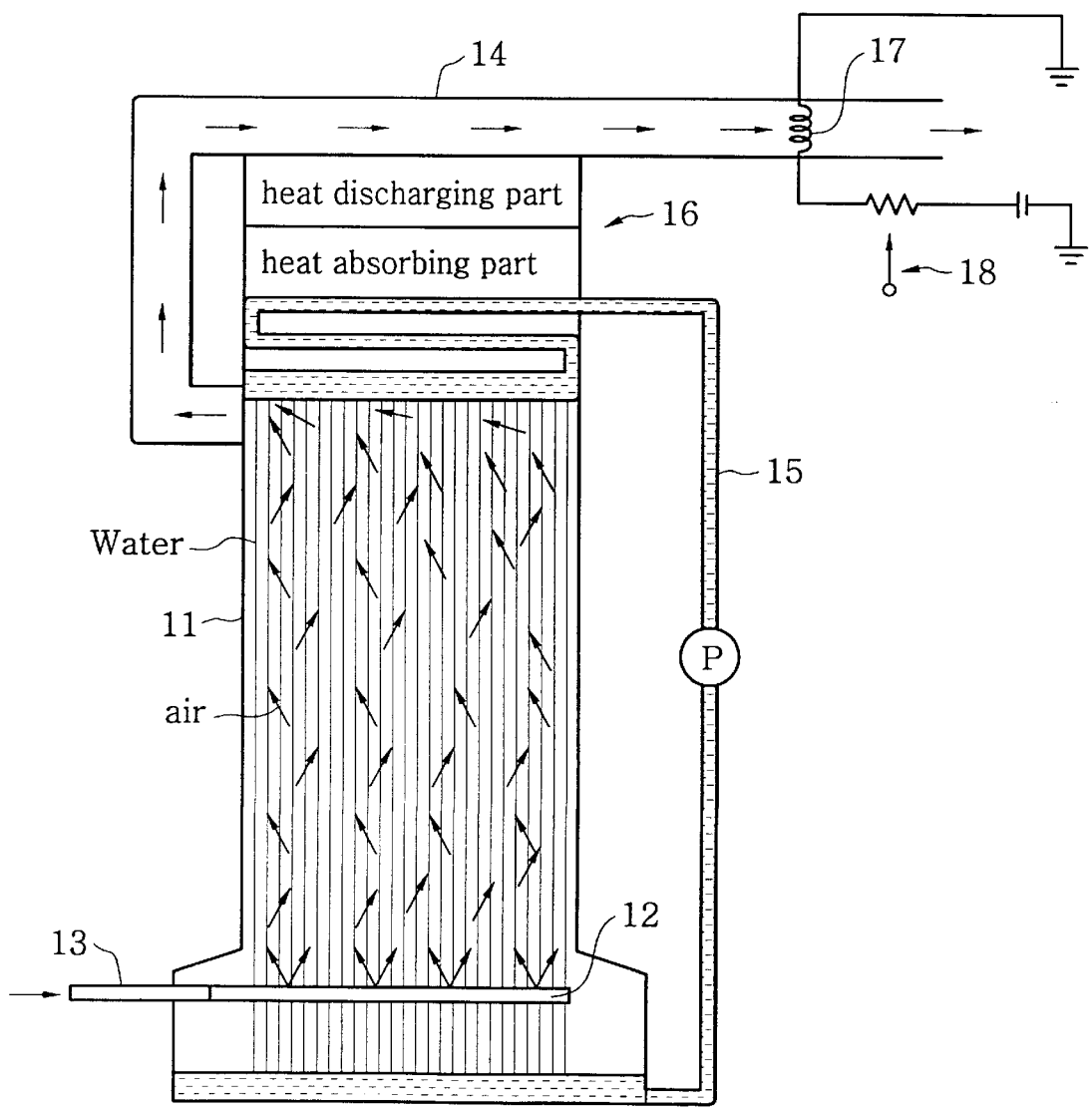
FIG. 4 is a schematic sectional view showing a construction of the controlling process of a temperature-humidity controller according to the present invention.
Figure 5:
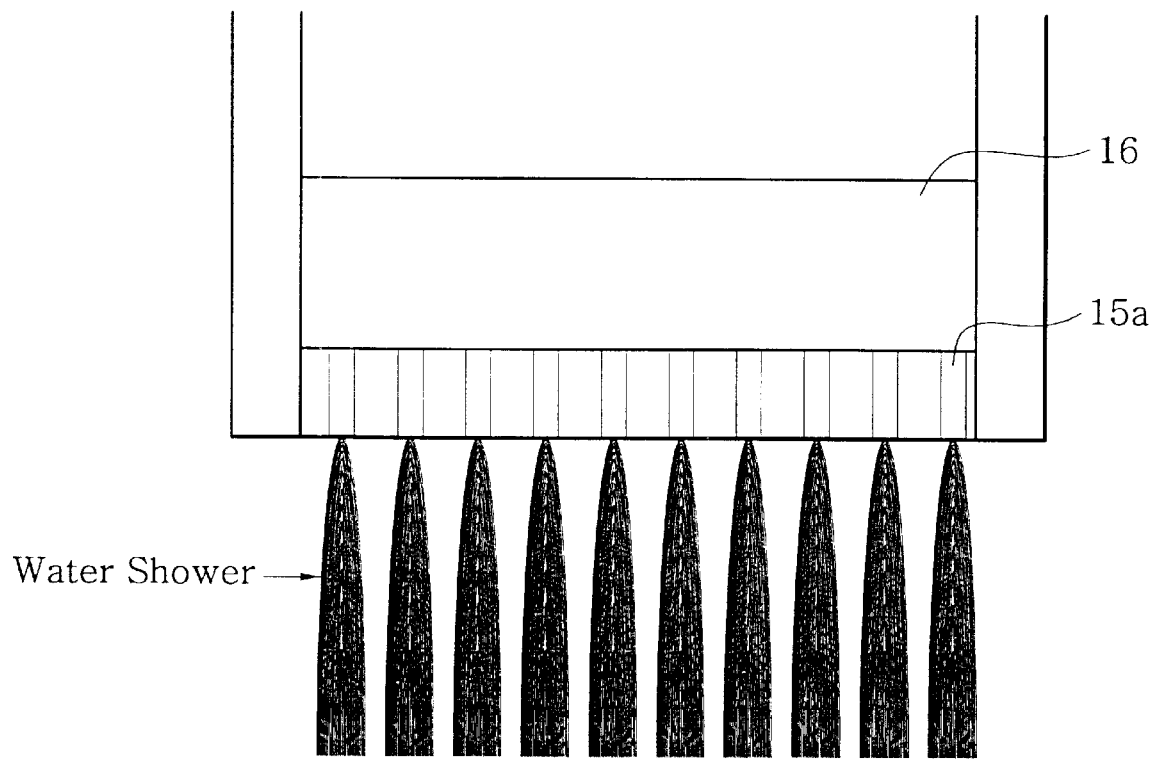
FIG. 5 is a enlarged detail of a nozzle part of a circulation pipe in FIG. 4.

As shown in FIGS. 4 and 5, in a lower portion of the housing 11, there is provided a discharging portion 12 for flow the air into an upper portion of the housing 11. The discharging portion 12 is connected with an inlet pipe 13. An outlet pipe 14 for supplying the processing air to the semiconductor equipment is disposed at the upper portion of the housing 11.

Moreover, in the upper portion of the housing 11, there is provided a nozzle part 15a for supplying a water flow into the inner of the housing 11, which is formed in one end of a circulation pipe 15, so that the air from the discharging portion 12 is contacted with the water flow from the nozzle 15a and is cooled. The other end of the circulation pipe 15 is connected to a lower side of the housing 11. And a pump P is mounted at a middle portion of the circulation pipe 15 so as to pump up the water stagnated at the lower portion of the housing 11 and supply the water to the upper portion of the housing 11.

Therefore, the water which is supplied into the housing 11 is continuously circulated through the circulation pipe 15.

Further, a semiconductor device 16 having a heat discharging part and a heat absorbing part is provided on the upper portion of the housing 11. The circulation pipe 15 is disposed to pass through the heat absorbing part of the semiconductor device 16. The outlet pipe 14 is disposed to pass through the heat discharging part of the semiconductor device 16.

In the outlet pipe 14, there is provided a heat coil 17 for heating the processing air at a desired temperature, e.g. 23° C. A variable resistor and a resistance regulating lever 18 are disposed between the heat coil 17 and a power supplying means for supplying a power source to the heat coil 17.

The operation and effect of the present invention will be disclosed more fully.

Since a temperature and a humidity of the processing air for a semiconductor manufacturing processes are generally 23° C. and 40%., the dew point of the air is 8.8° C.

That is, the processing air having 100% of the relative humidity at 8.8° C. will have the 40% of humidity at 23° C.

Therefore, when the water passes through the heat absorbing part of the semiconductor device 16 and is cooled at a desired temperature for cooling down the air at the temperature of 8.8° C. and then supplied to the inner portion of the housing 11, the processing air which is introduced through the inlet pipe 13 is injected into the upper portion of the housing 11, thereby passing through the cooled water flow. At this time, particles of the air is contacted with molecules of the water, whereby the air is cooled at the 8.8° C. of the dew point.

Here, the process of cooling the air at the dew point is achieved by adjusting the temperature of the water and the passage of the air to be contacted with the water.

As disclosed above, in the present invention, the dehumidifying and humidifying processes are simultaneously performed in the process of cooling the processing air. When the air is cooled at the dew point, if the amount of the moisture in the air is so large, the excessive moisture is condensed. And if the amount of the moisture in the air is insufficient, the air absorbs the moisture until the relative humidity is 100%. Therefore, the processing air supplied from the outlet pipe has a 100% of humidity at the 8.8° C. of the dew point.

According to the humidifying process, since the extra moisture is condensed below the dew point, although excessive moisture is provided in the air, the relative humidity is not changed.

Therefore, since the THC of the present invention is only required that the moisture greater than a necessary amount should be provided, it is not necessary to precisely control the humidifying process.

As disclosed above, the THC of the present invention in a type of dew point minimizes the problems in the conventional compulsive dehumidifying and humidifying processes. First, in the THC of the present invention, it is prevented that the unnecessary loss of energy, due to the processes of excessively dehumidifying the air and then humidifying again. Therefore, since the excessive load and trouble due to the impulsive manner is prevented and an error range due to the precise control can be reduced, the precise controlling of the humidity and a stability is secured. Further, manufacturing cost can be reduced due to a simplification of the construction, and an energy efficiency is improved.

The water which cools the processing air and is stagnated at the lower portion of the housing 11 is pumped by the pump P and is cooled again while passing through the heat absorbing part of the semiconductor device 16. After that, the water is supplied again to the inner portion of the housing 11.

Meanwhile, the processing air having a 100% of humidity at the 8.8° C. of dew point is preheated by the heat discharging part of the semiconductor device 16 while passing through the outlet pipe 14. And the air is then heated at 23° C. by the heat coil 17.

Due to the above process, the load of the heat coil 17 is reduced and the heat efficiency is increased.

Therefore, the processing air which passes through the heat coil 17 and is supplied to the semiconductor equipment has a 40% of humidity at 23° C.

Till now, this invention has been described above with reference to the embodiment in case that the precessing air is injected from the lower portion of the housing to the upper portion of the housing. It is evident, however, that many alternative modifications and variations will be apparent to those having skill in the art in light of the foregoing description. For example, in cases that the precessing air is injected from the upper portion of the housing to the lower portion of the housing or to other directions, the present invention can be applied. Accordingly, the present invention embraces all such alternative modifications and variations as fall within the spirit and scope of the appended claims.

What is claimed is:

1. A temperature-humidity controller for a semiconductor equipment comprising:

a housing;

an inlet pipe for introducing processing air into an inner portion of the housing;

a water supplying means for supplying water into the inner portion of the housing so as to contact with the processing air from the inlet pipe thereby simultaneously performing dehumidifying and humidifying processes;

a cooling means for cooling the water below a dew point, the cooling means including a heat absorbing part and a heat discharging part;

said water supplying means comprising a circulation pipe of which both ends are respectively connected with upper and lower portions of the housing, and which passes through the heat absorbing part; and a pump for circulating the water in the circulation pipe, the pump being disposed at a desired position of the circulation pipe.

a heating means for heating the air at a desired temperature which is dehumidified and humidified by the water supplying means; and an outlet pipe for supplying the heated air to the semiconductor equipment;

wherein the outlet pipe passes through the heat discharging part of the cooling means so that the air which is dehumidified and humidified is pre-heated prior to the heating process by said heat discharging part.

* * * * *